UNITED STATES PATENT OFFICE.

JACOB REESE, OF PITTSBURG, PENNSYLVANIA.

PHOSPHATIC FERTILIZER.

SPECIFICATION forming part of Letters Patent No. 372,087, dated October 25, 1887.

Application filed March 9, 1887. Serial No. 230,289. (No specimens.)

*To all whom it may concern:*

Be it known that I, JACOB REESE, a citizen of the United States, residing at Pittsburg, in the county of Allegheny and State of Pennsylvania, have invented a new and useful Improvement in Fertilizers; and I hereby declare the following to be a full, clear, and exact description of the invention, which will enable others skilled in the art to which it appertains to make and use the same.

The object of my invention is to produce a fertilizing compound containing a high percentage of phosphoric acid and a low percentage of water.

Dr. Muspratt, in his treatise on chemistry, in giving the composition of stable manure, shows by analysis that it contains seventy-one per cent. of water and less than one per cent. of phosphoric acid.

An average of seventy-eight analyses of Peruvian guano by the Chemist Way shows nearly fourteen per cent. of water:

| | |
|---|---:|
| Moisture | 13.67 |
| Organic matter and salts of ammonia | 52.05 |
| Earth phosphates | 22.78 |
| Alkaline salts | 9.67 |
| Sand | 1.83 |
| | 100.00 |

Analyses of superphosphate show a large amount of water, as moisture and hydrated gypsum, as follows, (Muspratt, edition of 1859, Vol. 2, page 564:)

| | |
|---|---:|
| Moisture | 10.00 |
| Animal matter | 27.00 |
| Biphosphate of lime (soluble) | 10.00 |
| Insoluble phosphate of lime | 15.00 |
| Hydrated gypsum | 34.00 |
| Alkaline salts | 4.00 |
| | 100.00 |

Analysis of patent bone fertilizer:

| | |
|---|---:|
| Water | 20.00 |
| Sulphate of ammonia | 14.85 |
| Phosphates of lime | 30.88 |
| Sulphate of lime | 7.20 |
| Alkaline chlorides | .54 |
| Nitrogenous organic matter | 20.31 |
| Insoluble matter | 6.22 |
| | 100.00 |

In the practice of the basic process for the manufacture of steel from phosphoritic metal, the phosphorus is eliminated from the metal and deposited in the slag as a phosphate; and I have discovered that when this basic slag is pulverized it may be used as a fertilizer with most excellent results.

The following is the average of sixteen samples of basic slag:

| | |
|---|---:|
| Lime | 51.36 |
| Phosphoric acid | 19.68 |
| Silica | 11.60 |
| Oxide of iron | 10.80 |
| Magnesia | 1.64 |
| Oxide of manganese | 4.26 |
| Sulphide of calcium | .66 |
| | 100.00 |

It will be noticed that there is neither water nor organic matter in the basic slag. The fertilizing agents are lime, phosphoric acid, and the sulphide of calcium, which comprise 71.70 per cent. of the mass.

This slag may be used as a fertilizer in its crude state, in the same manner that bones are sometimes used; but in order that the plants may more readily absorb the fertilizing properties the slag should be pulverized, and I find that the best results are obtained when the slag is pulverized to a fineness that eighty to ninety per cent. will pass through a mesh having ten thousand holes to the square inch, and from sixty to seventy per cent. of it will pass through a mesh having twenty thousand holes to the square inch.

In crushing the basic slag care should be taken to pick out any particles of iron which may be in it, and when the slag is to be pulverized to a degree of from ten to twenty thousand meshes to the inch, I recommend that magnetic separators be used to pick out the iron between each operation, in order that the machinery may not be damaged by particles of iron.

This basic slag-fertilizer may readily be distinguished from all other fertilizers, as it contains when fresh no water nor organic matter, and but little moisture at any time. The phosphoric acid and lime exists in it as a tetra-basic phosphate, in which one equivalent of phosphoric acid is chemically united with four equivalents of lime, ($P_2O_5 4CaO$.)

What I claim as my invention, and desire to secure by Letters Patent, is—

A fertilizer composed, essentially, of pulverized calcareous phosphatic basic slag.

JACOB REESE.

Witnesses:
JNO. H. RONEY,
FRANK M. REESE.